Patented Apr. 2, 1940

2,195,629

UNITED STATES PATENT OFFICE 2,195,629

BUTYL-ACETONE FERMENTATION PROCESS AND INOCULANT

John Müller, Philadelphia, Pa., assignor to Commercial Solvents Corporation, Terre Haute, Ind., a corporation of Maryland No Drawing. Application May 1, 1937, Serial No. 140,169

11 Claims. (Cl. 195—46)

The object of the invention is to provide improvements in fermentation processes producing butyl alcohol and acetone from carbohydrates, irrespective of any additional products or by-products, and more especially in the production of such products from molasses.

More specifically, the present invention provides a newly isolated organism, and an improved method whereby solutions of high sugar content will give higher yields of solvents, than heretofore produced by fermentation in either starch as in corn, sugar as in molasses, or any other carbohydrates.

The hitherto unisolated bacteria used in the present improved process has been named and will hereinafter be referred to as *Clostridium granulobacter acetobutylicum*. This organism is anaerobic but will grow and ferment below the surface in media incubated aerobically, and the necessity of excluding air from the apparatus is thereby obviated. This organism is readily isolated and kept in a condition capable of causing very active butyl alcohol and acetone fermentation in suitable mash, and is capable of acting upon relatively inexpensive sugars or sugar sources, such as blackstrap molasses, corn molasses (hydrol), beet molasses, and the like.

A further object is to provide a process assuring consistent results at all times, by providing a proper proportion of vegetable protein nitrogen and ammonia nitrogen in the mash, along with small percentages of calcium carbonate or other equivalent neutralizing agent.

The present process is advantageous in that it requires no previous conversion of starch or inversion of sucrose to monose sugars, but on the other hand, in the presence of vegetable proteins, a small percentage of calcium carbonate and ammonia nitrogen, successfully ferments even higher than 10% concentrations of sucrose, starch and molasses, as well as monose sugars such as glucose. However, while the organism in question does not develop on, nor hydrolyze the starch, nor form any neutral solvents in corn meal mash consisting solely of corn meal and water, with the addition of vegetable protein, calcium carbonate, and an ammonium salt, said organism effects high commercial yields of solvents from starch, as well as from sugar and different types of molasses. In the absence of these ingredients, very little growth of the organism is effected, the formation of acids arresting all fermentation, whether in starch, sugar or molasses.

Identification of organism

The manner of isolation of the particular species of bacteria used will be hereinafter described, but in order to identify the species it will be described in accordance with the descriptive chart of the Society of American Bacteriologists, as follows:

Source: Ear of sugar corn.
Name: *Clostridium granulobacter acetobutylicum*.

I. Morphology.
1. Vegetative cells: Motile.
    Medium used: Nutrient agar slant containing 2% glucose, anaerobic, temperature 30° C., age 24 hours.
    Form: Short rods, chain formation.
    Limits of size: 3.0–10.0 x 0.5–1.4 microns.
    Size of majority: 5.0 x 1.0 microns.
    Ends: Rounded.
    Stain: Deep blue with Loeffler's methylene blue; Clostridial forms stain blue-black with Lugol's iodine; black granules.
    Gram stain: Positive—variable.
2. Sporangia:
    Medium used: Nutrient agar slant containing 2% glucose; temperature 30° C.; spores formed after 3 days.
    Form: Spindle shaped; clavate; spores subpolar to polar.
    Limits of size: 6.0–10.0 x 1.0–2.3 microns.
    Size of majority: 8.0 x 1.5 microns.

II. Cultural features.
1. Agar slant
    Medium used: Nutrient agar, 2% glucose; anaerobically incubated; age 48 hours; temperature 30° C.
    Growth: Moderate.
    Form of growth: Slightly spreading.
    Luster: Dull.
    Optical character: Opaque.
    Surface: Contoured.
    Chromogenesis: None.
    Odor: Butyl alcohol.
    Consistency: Butyrous.
    Medium: Unchanged; liquid formed at bottom of tube.
2. Potato: 48 hours at 30° C.; anaerobically incubated.
    Growth: None visible.
    Form of growth: None visible.
    Elevation of growth: None.
    Luster: None.
    Odor: Butyl alcohol.
    Gas formation: Gas in substended liquid; no discoloration.
3. Nutrient broth:
    Surface growth: None.
    Clouding: None.
    Odor: None.
    Sediment: None.
    Amount of sediment: None.

4. Milk:
   At 30° C. acid and gas; slight coagulation; no peptonization.
5. Litmus milk:
   48 hours at 30° C.; bottom of tube reduced to white; gas, acid and clot formed; upper part of tube and clot red; after 12 days clot not digested; liquid clear, clot red.
6. Agar colonies:
   48 hours, 30° C. (Observed immediately on removal from anaerobic incubation vessel.)
   Growth: Good.
   Surface: Smooth.
   Elevation: Raised to convex.
   Luster: Dull.
   Form of growth: Round.
   Internal structure: Granular.
7. Nitrogen source:
   Protein nitrogen; ammonia nitrogen.
8. Gelatin stab:
   Medium used: Nutrient gelatin, 2% glucose; temperature 22° C., 60 days.
   Growth: Uniform.
   Line of puncture: Filiform.
   Liquefication: None in 60 days.

III. Physiological and biochemical features.
1. Fermentation tubes containing nutrient broth. Substances fermented with evolution of gas and production of acids as follows:

|  | Gas | Acid |
| --- | --- | --- |
| Dextrose | + | + |
| Sucrose | + | + |
| Lactose | + | + |
| Maltose | + | + |
| Inulin | + | + |
| Starch | + | + |
| Salicin | + | + |
| Dextrine | + | + |
| Mannitol | + | + |
| Glycerol | − | − |
| Galactose | + | + |

2. Optimum reaction of media:
   For growth and fermentation, initial pH values 6.0–6.8.
   Bromo-cresol-purple, Bromo-thymol-blue.
3. Temperature relations:
   Optimum temperature range for fermentation 28° C. to 33° C.
4. Nitrate reduction:
   Medium used: nitrate broth containing 2% dextrose; temperature 30° C.
   Nitrite: None after 10 days.
   Gas: After first day.
5. Production of indole:
   Medium used: Tryptophane broth containing 2% dextrose.
   Test used: Erlich-Bohme.
   Indole: Absent in 10 days.
6. Production of hydrogen sulphide:
   Medium used: Bacto-lead acetate agar.
   Hydrogen sulphide absent in 10 days.
7. Spores will stand heating for 2 minutes in boiling water.
8. Neutral solvents produced consist of 60%–75% butyl alcohol, 25%–30% acetone and 1–10% ethyl alcohol.
9. Carbon dioxide and hydrogen are given off during fermentation.

*Culture and isolation*

The organism was discovered and isolated as follows: A partially decayed piece of an ear of sugar corn was placed in a sterile 10% molasses medium, containing both calcium carbonate and ammonium chloride, which was then incubated at 30° C. for 72 hours. A strong odor of butyl alcohol was given off at the end of 36 hours.

After sporulation, these spores were poured into hot fresh medium of the same composition as above, which was then cooled rapidly. In other words the culture was heat-shocked, and by such term I mean to indicate that the fresh medium is heated to 100° C. and into this heated medium is poured a small amount, as for example, 2–4% by volume, of organism-containing medium, after which the mixture is quickly cooled to about 30° C., in order to kill the vegetative cells but permit preservation of the spores. After 24 hours, the vegetative cells were plated on nutrient agar containing 2% sucrose, the plates being incubated at 30° C. for 48 hours. Colonies were taken out and placed in tubes containing the same molasses media as before, these tubes being incubated at 30° C. for four days to ensure sporulation. In order to preserve the spores, they may be placed in a refrigerator for future use, and can be so kept for many months without losing their vitality, or they may be stored in any usual manner.

To set up a fermentation of *Clostridium granulobacter acetobutylicum* the procedure is as follows:—Spores which have been kept in the medium described above, or in a 5% sucrose medium, containing corn gluten feed, ammonium phosphate and calcium carbonate, are heat shocked into a molasses mash at 100° C., which may contain from 3 to 5% sugar, and which also contains ammonium phosphate and calcium carbonate. The mash is immediately cooled rapidly, and is kept at 30° C. for about 24 hours in an incubator, in order to permit the spores to germinate. The vegetative cells after this period are very active and occur in abundance. These vegetative cells after 24 hours development are then removed from the incubator, and kept thereafter at a temperature between 15° C., and 21° C. As the result of this lower temperature the culture remains active for a considerable time, and may be used for subsequent inoculations.

Before inoculating the final mash, it is usually desirable to make five or six consecutive transfers of the culture in a mash of the type previously described. The final mash, which may contain up to 10% by weight, or higher, of sugar in the form of molasses, and which should contain both ammonia nitrogen and protein nitrogen, is then inoculated and maintained at a temperature of from 30° C. to 32° C. Under optimum conditions, fermentation is completed in from 40 to 72 hours, depending upon the concentration of the carbohydrate, and the amount of protein nitrogen employed. The desired end reaction of such a fermentation is neutral or slightly alkaline to Brom-thymol-blue, as determined with a few drops of the mash mixed with the indicator in a porcelain test plate.

*Optimum conditions*

It has been found that in order to obtain high yields, it is necessary to use vegetable proteins and ammonia nitrogen as nutrients, and to control the acidity of the mash during the fermentation to secure the desired final hydrogen ion concentration. Neither ammonia nitrogen nor vegetable proteins can be successfully used alone as a nutrient, nor can calcium carbonate or other neutralizing agent be used satisfactorily without the other two mentioned ingredients, except to the very limited degree hereinafter pointed out by means of illustrative examples.

The temperature of fermentation is maintained below 35° C., while control of the acidity of the mash during fermentation is effected so that the final hydrogen ion concentration caused by the action of the bacteria falls within the pH range of 6.0 to 7.0, and preferably from 6.5 to 7.0, as determined with Brom-thymol-blue in the manner previously indicated. The temperature which has been found to be essential for the fermentation, ranges from 25° C. to 35° C. Of course, growth and active fermentation will occur throughout a much wider range, but consistently high yields of solvents can only be assured at temperatures of 28° C. to 33° C., or, still better, from 30° C. to 33° C.

As to the nutrients necessary for successful fermentation, these comprise ammonia nitrogen and vegetable proteins, which latter may in turn be in the forms of corn gluten, corn gluten feed, corn germ oil meal, malt sprouts, steep water, or the like. Some of these materials, such as gluten feed and corn germ oil meal, vary considerably due to differences in the manufacturing procedures employed, and samples may be obtained which are inferior nutrients. To avoid such a contingency, one may employ materials such as malt sprouts, or the like, which are not subject to such variability.

*Commercial fermentation*

In the production of butyl alcohol and acetone commercially by means of *Clostridium granulobacter acetobutylicum*, carbohydrates may be used in the form of molasses such as blackstrap or corn molasses, containing approximately 50% of sugars. The molasses is diluted with water to provide a solution containing up to 20% molasses, which equals a sugar concentration approximately up to 10% by weight. To such solution corn gluten feed or other suitable protein is added, together with ammonia nitrogen and calcium carbonate. The complete mash thus formed is then sterilized and inoculated with a 3%-5% inoculum or seed of *Clostridium granulobacter acetobutylicum* vegetative cells.

*Examples of fermentation*

In the following illustrations, it is to be understood that molasses containing 50% sugars is employed, unless otherwise specified:

1. If the organism is used with molasses only, the production is as follows:

15.0% molasses of approximately 50% sugar content,
3.8% yields of solvents,
2.9 grams per liter.

2. If the organism is used with molasses and corn gluten feed, the result is as follows:

15.0% molasses of approximately 50% sugar content,
2.5% corn gluten feed,
18.0% yield of solvents,
13.5 grams per liter.

3. If the organism is used with molasses and calcium carbonate only, the result is as follows:

15.0% molasses of approximately 50% sugar content,
0.5% calcium carbonate,
8.4% yield of solvents,
6.3 grams per liter.

4. If the organism is used with molasses and an ammonia salt only, the result is as follows:

15.0% molasses of approximately 50% sugar content,
0.1% ammonium salt, such as ammonium chloride, ammonium sulphate, or ammonium phosphate,
8.9% yield of solvents,
6.7 grams per liter.

5. By using the organism with molasses in combination with calcium carbonate, or an ammonium salt, alternatively but not simultaneously, the following results are obtained:

15.0% molasses of approximately 50% sugar content,
2.5% corn gluten feed,
0.5% calcium carbonate,
16.8% yield of solvents,
12.6 grams per liter.
15.0% molasses of approximately 50% sugar content,
2.5% corn gluten feed,
0.1% ammonium salt,
18.4% yield of solvents,
13.8 grams per liter.

6. By omitting the corn gluten feed and using only the calcium carbonate and ammonia nitrogen in combination, the results are practically the same, and are as follows:

15.0% molasses of approximately 50% sugar content,
0.5% calcium carbonate,
0.1% ammonium salt,
18.3% yield of solvents,
13.8 grams per liter.

7. By using the organism with molasses in combination with corn gluten feed, calcium carbonate and ammonia nitrogen, the result is as follows:—

15.0% molasses of approximately 50% sugar content,
2.5% corn gluten feed,
0.5% calcium carbonate,
0.1% ammonium salt,
30.5% yield of solvents,
22.9 grams per liter.

8. When the organism is used with glucose in combination with corn gluten feed, calcium carbonate, and ammonia nitrogen in the form of a salt, the result is as follows:

9.0% glucose (corn sugar),
2.5% corn gluten feed,
0.5% calcium carbonate,
0.2% ammonium salt,
31.1% yield of solvents,
25.2 grams per liter.

9. When the organism is used with sucrose in combination with corn gluten feed, calcium carbonate, and ammonia nitrogen in the form of a salt, the result is as follows:

9.0% sucrose,
2.5% corn gluten feed,
0.5% calcium carbonate,
0.2% ammonium salt,
30.0% yield of solvents,
27.0 grams per liter.

In order to show something of the uniformity with which the present bacteria and process operate with molasses from different sources, and with correspondingly different sugar contents, the following four examples are given, in each case 2.5% corn gluten feed, 0.5% calcium carbonate and ammonia nitrogen in the form of 0.1% of an ammonium salt being used in combination with the molasses:

10. 15.0% molasses of approximately 50% sugar content,
    31.5% yield of solvents,
    23.6 grams per liter.
11. 14.0% molasses of approximately 53.0% sugar content,
    31.4% yield of solvents,
    23.5 grams per liter.
12. 12.5% molasses of approximately 59.7% sugar content,
    31.6% yield of solvents,
    23.6 grams per liter.
13. 12.5% molasses of approximately 60.7% sugar content,
    32.2% yield of solvents,
    24.6 grams per liter.

As further indicating the uniformity of the process and bacillus with respect to other sources of protein, the following examples are given:

14. 12.0% molasses of approximately 50% sugar content,
    2.0% corn germ oil meal,
    0.5% calcium carbonate,
    0.1% ammonium salt,
    30.8% yield of solvents,
    18.5 grams per liter.
15. 12.0% molasses of approximately 50% sugar content,
    2.0% corn gluten meal,
    0.5% calcium carbonate,
    0.1% ammonium salt,
    30.6% yield of solvents,
    18.4 grams per liter.
16. 10.0% hydrol (or corn molasses, containing approximately 70.0% carbohydrates),
    2.5% corn gluten feed,
    0.5% calcium carbonate,
    0.2% ammonium salt,
    28.6% yield of solvents,
    20.0 grams per liter.

A final series of tests in which steep water was used is illustrated in the following examples. From these results it is even more clearly apparent that commercial yields require the presence of ammonia nitrogen, and control of the hydrogen ion concentration, e. g., the use of calcium carbonate, while the use of a small quantity of steep water very materially reduces the amount or percentage of other proteins required, such as corn germ oil meal and corn gluten meal.

17. 14.0% molasses of approximately 52.5% sugar content,
    1.0% steep water,
    0.5% corn germ oil meal,
    0.5% corn gluten meal,
    14.0% yield of solvents,
    10.5 grams per liter.
18. 14.0% molasses of approximately 52.5% sugar content,
    1.0% steep water,
    0.5% corn germ oil meal,
    0.5% corn gluten meal,
    0.5% calcium carbonate,
    21.7% yield of solvents,
    16.0 grams per liter.
19. 14.0% molasses of approximately 52.5% sugar content,
    1.0% steep water,
    0.5% corn germ oil meal,
    0.5% corn gluten meal,
    0.1% ammonium phosphate,
    15.1% yield of solvents,
    11.1 grams per liter.
20. 14.0% molasses of approximately 52.5% sugar content,
    1.0% steep water,
    0.5% corn germ oil meal,
    0.5% corn gluten meal,
    0.5% calcium carbonate,
    0.1% ammonium phosphate,
    32.1% yield of solvents,
    23.6 grams per liter.

Still further showing the value of using steep water, it was found that in its presence, the corn gluten meal can be eliminated entirely and the amount of steep water itself decreased, and at that obtain a high yield, although the time required with each of the following was 70 hours for No. 21 and 60 hours for No. 22.

21. 14.0% molasses of approximately 52.5% sugar content,
    0.6% steep water,
    0.4% corn germ oil meal,
    0.3% calcium carbonate,
    0.1% ammonium phosphate,
    31.3% yield of solvents,
    23.0 grams per liter.
22. 14.0% molasses of approximately 52.5% sugar content,
    0.8% steep water,
    0.6% corn germ oil meal,
    0.4% calcium carbonate,
    0.1% ammonium phosphate,
    32.4% yield of solvents,
    23.8 grams per liter.

Supplementing Example 22, by using 0.8% steep water and 0.4% corn germ oil meal, 5% sugar produced practically the identical yield in 40 hours, and 6% sugar produced the same in 44 hours.

The foregoing facts and examples demonstrate, that, if the commercial yields are to be produced, the outstanding formula from the standpoint of the economy factor is shown to be either No. 21 or No. 22.

It should also be understood in conclusion, that the technique and details of the operation of the improved process as hereinbefore given may be varied within certain limits, and that the proportions and yields specified in the several examples cited respectively represent the ratios thus far preferred, in view of the average results obtained under laboratory conditions, wherefore neither the proportions of ingredients comprising the mash, nor the figures representing the solvents produced are to be taken as absolute under all conditions, and may, therefore, be varied as required. As in previous processes, it is likewise true in this case, that the yields indicated are those obtained after a reasonable period of fermentation, beyond which it is considered that any minor additional quantities of solvents produced do not warrant the continuations of the fermentation longer at increased costs, incidental to consumption of fuel, tying up of equipment, and similar factors.

It is to be especially noted, however, that in order to obtain high yields of solvents ammonia salts can not be used as the sole source of nitrogen. It is in all cases necessary to add protein nitrogen in one or more forms, in order to assure commercial yields from the unusually high sugar concentrations, for which this process is noteworthy.

It is to be understood, obviously, that the examples herein given, by way of illustration, are not to be taken as limiting the invention to the specific materials and quantities employed. Thus, other fermentable carbohydrate materials, such as grain meal, hydrol, beet molasses, inverted cane molasses, and the like, can be substituted for the specific materials mentioned in the examples. Likewise, the acidity control of the fermentation can be effected by the use of neutralizing agents other than calcium carbonate. Any other non-toxic insoluble alkaline neutralizing agent such as barium carbonate, may be introduced into the initial mash in concentrations equivalent to the amounts of calcium carbonate employed, or soluble neutralizing agents such as ammonium hydroxide may be utilized by introducing these materials continuously or semi-continuously during the fermentation. The soluble neutralizing agents should be introduced in a manner to simulate the action of an excess of an insoluble neutralizing agent and enable the final hydrogen ion concentration brought about by the action of the bacteria to fall within the same range as that secured by the use of the insoluble materials. Various other modifications of procedure will readily suggest themselves to those skilled in the art. It is to be understood that the use of any equivalent materials or any such modifications of procedure is included within the scope of my invention.

The present application is a continuation-in-part of my application Serial No. 55,611, filed December 21, 1935.

Having thus described my invention, what I claim and desire to protect by Letters Patent of the United States is:

1. The process which comprises adding a culture of the hereinbefore described *Clostridium granulobacter acetobutylicum* to a sterilized molasses mash containing vegetable protein, calcium carbonate and ammonia nitrogen in the form of a salt, and maintaining the resulting mixture at a temperature sufficient to bring about active fermentation.

2. The process which comprises adding a culture of the hereinbefore described *Clostridium granulobacter acetobutylicum* to a sterilized molasses mash containing about 5% to 10% of fermentable sugars, less than 3.0% of vegetable protein, less than 0.6% of calcium carbonate and less than 0.3% ammonia nitrogen in the form of a salt, and maintaining the resulting mixture at a temperature sufficient to bring about active fermentation.

3. The process, which consists in keeping spores of *Clostridium granulobacter acetobutylicum* in a medium of approximately 5% sucrose, containing vegetable protein, calcium carbonate and an ammonium salt, heat shocking the same into a boiling mash comprising approximately 10 percent of molasses, calcium carbonate and an ammonium salt, immediately cooling said mash rapidly, maintaining the same at 30° C. for about twenty-four hours in an incubator to develop the spores into vegetative cells, and then maintaining the mash containing the same vegetative cells at a temperature of between 15° C. and 21° C. until used to inoculate the first seed mash of a commercial run.

4. In a process for the production of butyl alcohol by the action of bacteria on a fermentable carbohydrate mash of the class consisting of starch mashes and sugar mashes, the improvement which comprises incorporating in the mash vegetable protein nitrogen, ammonia nitrogen, and calcium carbonate, and subjecting the mash to the action of a culture of the hereinbefore described *Clostridium granulobacter acetobutylicum*.

5. In a process for the production of butyl alcohol by the fermentation of an amylaceous mash, the improvement which comprises incorporating in the mash vegetable protein nitrogen, ammonia nitrogen, and calcium carbonate, and subjecting the mash to the action of a culture of the hereinbefore described *Clostridium granulobacter acetobutylicum*.

6. In a process for the production of butyl alcohol by the fermentation of a sugar mash, the improvement which comprises incorporating in the mash vegetable protein nitrogen, ammonia nitrogen, and calcium carbonate, and subjecting the mash to the action of a culture of the hereinbefore described *Clostridium granulobacter acetobutylicum*.

7. In a process for the production of butyl alcohol by the fermentation of a molasses mash, the improvement which comprises incorporating in the mash vegetable protein nitrogen, ammonia nitrogen, and calcium carbonate, and subjecting the mash to the action of a culture of the hereinbefore described *Clostridium granulobacter acetobutylicum*.

8. In a process for the production of butyl alcohol by the action of bacteria on a fermentable carbohydrate mash of the class consisting of starch mashes and sugar mashes, the improvement which comprises incorporating in the mash calcium carbonate, vegetable protein nitrogen selected from the group consisting of corn gluten, corn gluten feed, corn germ oil meal, malt sprouts, and steep water, and ammonia nitrogen selected from the group consisting of ammonium chloride, ammonium sulphate, and ammonium phosphate, and subjecting the mash to the action of a culture of the hereinbefore described *Clostridium granulobacter acetobutylicum*.

9. In a process for the production of butyl alcohol by the action of bacteria on a fermentable carbohydrate mash of the class consisting of starch mashes and sugar mashes, the improvement which comprises incorporating in the mash vegetable protein nitrogen and ammonia nitrogen, subjecting the mash to the action of a culture of the hereinbefore described *Clostridium granulobacter acetobutylicum*, and supplying alkaline neutralizing material to the fermenting mash to control the hydrogen ion concentration whereby the final pH secured by the action of the bacteria falls within the range 6.0 to 7.0.

10. In a process for the production of butyl alcohol by the fermentation of a sugar mash, the improvement which comprises incorporating in the mash vegetable protein nitrogen and ammonia nitrogen, subjecting the mash to the action of a culture of the hereinbefore described *Clostridium granulobacter acetobutylicum,* and supplying calcium carbonate to the fermenting mash to control the hydrogen ion concentration whereby the final pH secured by the action of the bacteria falls within the range 6.0 to 7.0.

11. An inoculant for the action of bacteria on a fermentable carbohydrate mash of the class consisting of starch mashes and sugar mashes comprising bacteria herein described and designated as *Clostridium granulobacter acetobutylicum,* and carrying medium for said bacteria comprising a saccharine mash containing vegetable protein nitrogen, ammonia nitrogen, and calcium carbonate.

JOHN MÜLLER.